US011218609B2

(12) United States Patent
Sone

(10) Patent No.: US 11,218,609 B2
(45) Date of Patent: *Jan. 4, 2022

(54) TERMINAL DEVICE AND NON-TRANSITORY COMPUTER-READABLE MEDIUM FOR TERMINAL DEVICE

(71) Applicant: BROTHER KOGYO KABUSHIKI KAISHA, Nagoya (JP)

(72) Inventor: Tatsuhiko Sone, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/865,460

(22) Filed: May 4, 2020

(65) Prior Publication Data

US 2020/0267273 A1   Aug. 20, 2020

Related U.S. Application Data

(63) Continuation of application No. 16/181,550, filed on Nov. 6, 2018, now Pat. No. 10,659,634.

(30) Foreign Application Priority Data

Nov. 13, 2017   (JP) .............................. JP2017-218187

(51) Int. Cl.
*H04N 1/00*   (2006.01)

(52) U.S. Cl.
CPC ....... *H04N 1/00503* (2013.01); *H04N 1/0097* (2013.01); *H04N 1/00244* (2013.01);
(Continued)

(58) Field of Classification Search
CPC ........... H04N 1/00503; H04N 1/00413; H04N 1/00244; H04N 1/00474; H04N 1/0097; H04N 2201/0094
(Continued)

(56) References Cited

U.S. PATENT DOCUMENTS

| 8,982,373 | B2* | 3/2015 | Saito ................. H04N 1/00204 358/1.13 |
| 2011/0084925 | A1* | 4/2011 | Baik ................... G06F 3/04817 345/173 |

(Continued)

FOREIGN PATENT DOCUMENTS

| JP | 2012-203742 A | 10/2012 |
| JP | 2016-114982 A | 6/2016 |

(Continued)

OTHER PUBLICATIONS

Office Action dated Jun. 27, 2019 from parent U.S. Appl. No. 16/181,550, filed Nov. 6, 2018.

(Continued)

*Primary Examiner* — Neil R McLean
(74) *Attorney, Agent, or Firm* — Scully, Scott, Murphy & Presser, PC

(57) ABSTRACT

A terminal device may register first device information of a first image processing device in a memory; specify by using the first device information, N applications corresponding to one or more types of image processes that the first image processing device is capable of executing from among M applications; display a first menu screen on a display unit, the first menu screen including N icons indicating the specified N applications, each of the N icons having a first type of displaying state that is capable of accepting a selecting operation for using an application, the first menu screen not including each of (M-N) icons having the first type of displaying state, the (M-N) icons indicating (M-N) applications; send an execution instruction to the first image processing device by using a target application indicated by a target icon selected from among the N icons in the first menu screen.

6 Claims, 11 Drawing Sheets

(52) U.S. Cl.
CPC ..... *H04N 1/00413* (2013.01); *H04N 1/00474* (2013.01); *H04N 2201/0094* (2013.01)

(58) Field of Classification Search
USPC ........................................................ 358/1.13
See application file for complete search history.

(56) References Cited

U.S. PATENT DOCUMENTS

| | | | |
|---|---|---|---|
| 2012/0243043 A1 | 9/2012 | Asai | |
| 2014/0139859 A1 | 5/2014 | Saito | |
| 2015/0163371 A1 | 6/2015 | Asai | |
| 2016/0173703 A1 | 6/2016 | Asai | |
| 2016/0357405 A1 | 12/2016 | Asai | |
| 2017/0099402 A1* | 4/2017 | Yamada | ................ G06F 9/5011 |
| 2017/0153780 A1 | 6/2017 | Asai | |
| 2018/0160007 A1 | 6/2018 | Asai | |
| 2019/0294307 A1 | 9/2019 | Asai | |
| 2020/0259966 A1 | 8/2020 | Asai | |
| 2021/0081090 A1 | 3/2021 | Asai | |

FOREIGN PATENT DOCUMENTS

| | | |
|---|---|---|
| JP | 2017-004078 A | 1/2017 |
| JP | 2017-054334 A | 3/2017 |
| JP | 2017-097751 A | 6/2017 |
| JP | 2017-117293 A | 6/2017 |

OTHER PUBLICATIONS

Notice of Allowance dated Jan. 13, 2020 from parent U.S. Appl. No. 16/181,550, filed Nov. 6, 2018.
Notification of Reasons for Rejection dated Nov. 16, 2021 received from the Japanese Patent Office in related application 2017-218187 together with English language translation.

* cited by examiner

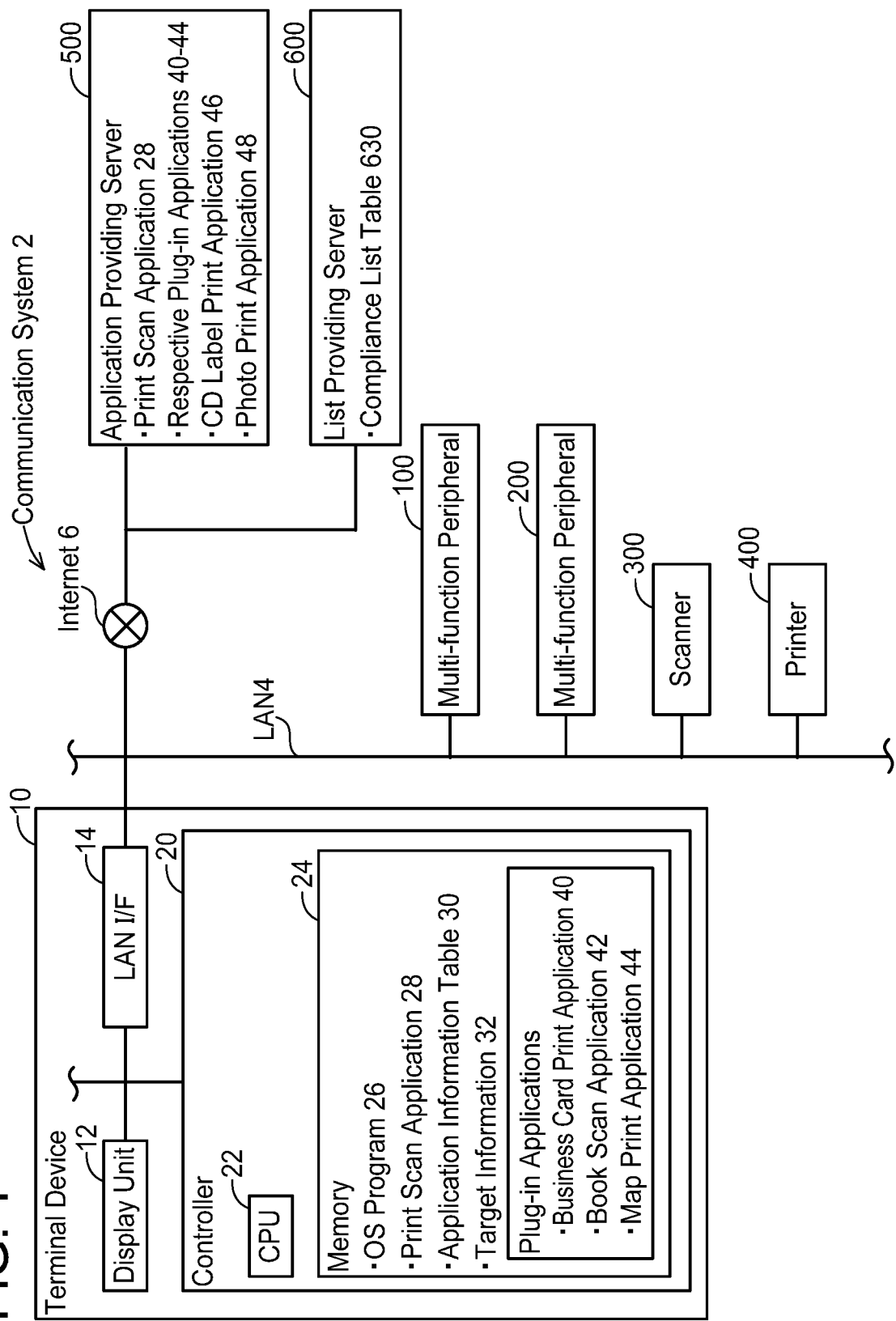

FIG. 2

Application Information Table 30

Application Information

| Information Number | Application ID | Application Name | Grayout Flag | Determination Flag |
|---|---|---|---|---|
| 1 | A0001 | Business Card Print | OFF | OFF |
| 2 | A0002 | Book Scan | OFF | OFF |
| 3 | A0003 | Map Print | OFF | OFF |

Compliance List Table 630

| Application ID | Application Name | Compliance List |
|---|---|---|
| A0001 | Business Card Print | "Ink_mfp", "Ink_print"... |
| A0002 | Book Scan | "Ink_mfp", "Lz_mfp"... |
| A0003 | Map Print | "Ink_mfp", "Lz_mfp", "Ink_print"... |
| A0004 | CD Label Print | "Ink_mfp", "Ink_print"... |
| A0005 | Photo Print | "Ink_mfp", "Lz_mfp", "Ink_print"... |
| ⋮ | ⋮ | ⋮ |

FIG. 3

| Image Processing Device | Model Name | IP Address | Function | | Compliance Application |
|---|---|---|---|---|---|
| Multi-function Peripheral 100 | "Ink_mfp" | A1 | Print | Inkjet Scheme | Business Card Print<br>Map Print<br>CD Label Print<br>Photo Print |
| | | | Scan | FB Scheme | Book Scan |
| | | | | ADF Scheme | None |
| Multi-function Peripheral 200 | "Lz_mfp" | A2 | Print | Laser Scheme | Map Print<br>CD Label Print |
| | | | Scan | FB Scheme | Book Scan |
| | | | | ADF Scheme | None |
| Scanner 300 | "ADF_scan" | A3 | Print | | |
| | | | Scan | ADF Scheme | None |
| Printer 400 | "Ink_print" | A4 | Print | Inkjet Scheme | Business Card Print<br>Map Print<br>CD Label Print<br>Photo Print |
| | | | Scan | | |

TERMINAL DEVICE AND NON-TRANSITORY COMPUTER-READABLE MEDIUM FOR TERMINAL DEVICE

CROSS-REFERENCE TO RELATED APPLICATION

This application is a continuation application of U.S. Ser. No. 16/181,550 filed on Nov. 6, 2018 and claims priority to Japanese Patent Application No. 2017-218187 filed on Nov. 13, 2017, the contents of which are hereby incorporated by reference into the present application.

TECHNICAL FIELD

The disclosure herein discloses a technology utilized in a terminal device for using an application to send an execution instruction of an image process corresponding to the application to an image processing device.

DESCRIPTION OF RELATED ART

For example, a main application of a terminal device acquires image data from a scanner. The main application has a sharing function to share this image data with another application, and in a case of accepting an execution instruction of the sharing function, the main application displays a list of one or more applications, which are share counterpart candidates, capable of processing the image data. When an application in the list is selected by a user, the selected application as a share counterpart application executes a predetermined process (such as sending an e-mail) on the image data.

SUMMARY

The above technique does not assume that in which the main application uses the share counterpart application selected by the user to cause an image processing device to execute the image process corresponding to the share counterpart application.

The disclosure herein provides a technique that prevents an execution instruction of an image process from being sent to an image processing device in a situation where the image processing device is not capable of executing the image process corresponding to the share counterpart application.

A non-transitory computer-readable medium storing computer-readable instructions for a terminal device is disclosed herein. The computer-readable instructions, when executed by a processor of the terminal device, may cause the terminal device to: register first device information of a first image processing device in a memory of the terminal device in a case where the first image processing device is designated, from among one or more image processing devices with which the terminal device is capable of communicating, as a target image processing device that is to execute an image process in accordance with an instruction from the terminal device; after the first device information has been registered in the memory, specify by using the first device information in the memory, from among M applications that the computer-readable instructions are capable of using, N applications corresponding to one or more types of image processes that the first image processing device is capable of executing, the M being an integer of 1 or larger and the N being an integer satisfying 1≤N≤M; display a first menu screen on a display unit of the terminal device, the first menu screen including N icons indicating the specified N applications, each of the N icons having a first type of displaying state that is capable of accepting a selecting operation for using an application, the first menu screen not including each of (M-N) icons having the first type of displaying state, the (M-N) icons indicating (M-N) applications other than the N applications among the M applications; and in a case where a target icon is selected from among the N icons included in the first menu screen, send an execution instruction to the first image processing device by using a target application indicated by the selected target icon, the execution instruction being for a target image process corresponding to the target application.

A terminal device comprising a memory configured to store the computer-readable instructions above and a control method for implementation of the terminal device are also novel and useful.

BRIEF DESCRIPTION OF THE DRAWINGS

FIG. 1 shows a configuration of a communication system;
FIG. 2 shows an application information table and a compliance list table;
FIG. 3 shows a table indicating applications compliant with respective image processing devices.

EMBODIMENTS

Figure 4:
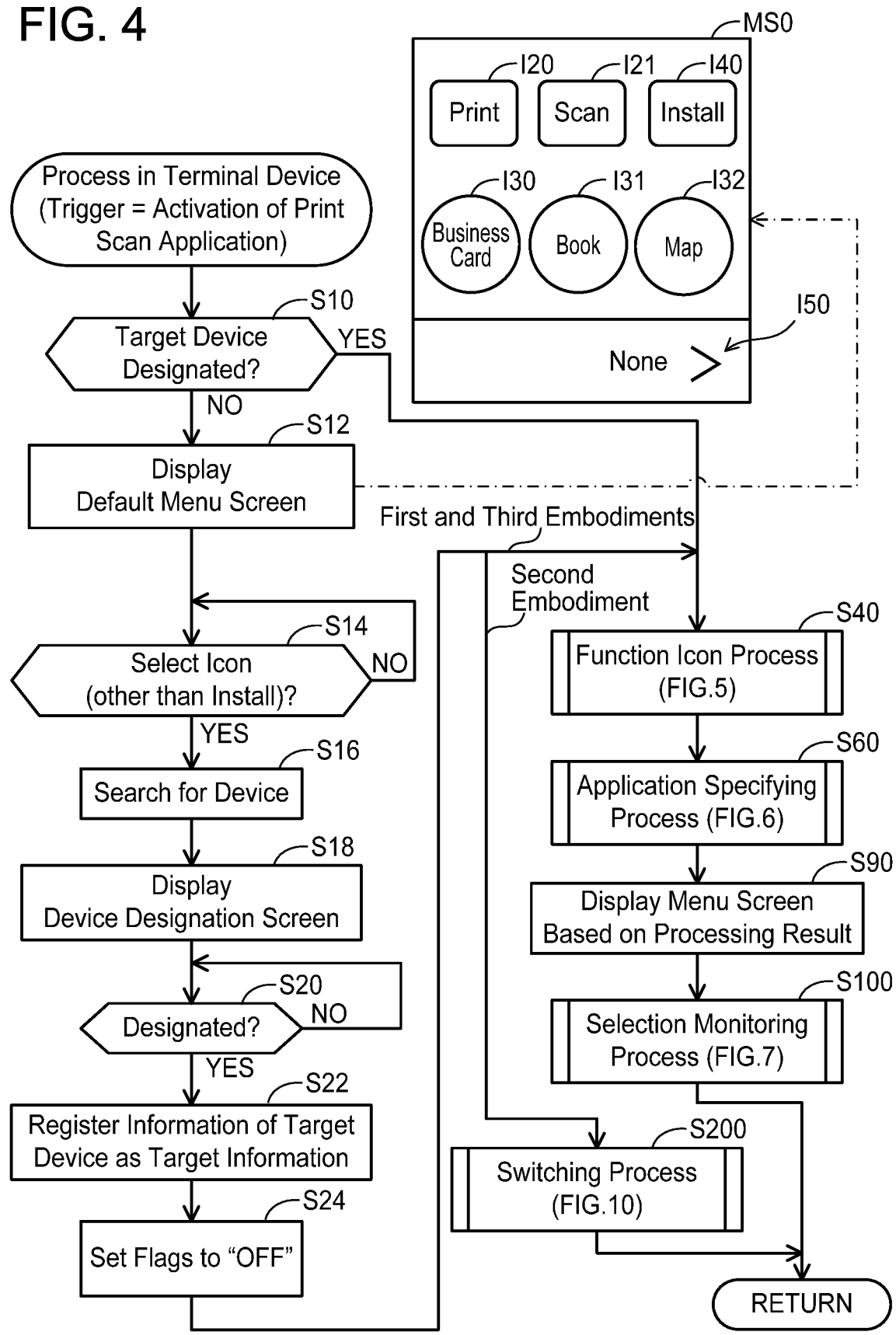
FIG. 4 shows a flowchart of a process in a terminal device.

First Embodiment (Configuration of Communication System 2; FIG. 1)

As shown in FIG. 1, a communication system 2 includes a terminal device 10, a plurality of image processing devices 100 to 400, an application providing server 500, and a list providing server 600. The image processing devices 100 to 400 include multi-function peripherals 100, 200 capable of executing both a print function and a scan function, a scanner 300 capable of executing only the scan function among the print function and the scan function, and a printer 400 capable of executing only the print function among the print function and the scan function. The terminal device 10 and the respective image processing devices 100 to 400 are connected to a same LAN (abbreviation of Local Area Network) 4. The LAN 4 may be a wired LAN or a wireless LAN.

Further, the LAN 4 is connected to the Internet 6. The application providing server 500 and the list providing server 600 are located on the Internet 6. Devices belonging to the LAN 4 (such as the terminal device 10) are capable of communicating with servers located on the Internet 6 (such as 500) through the LAN 4 and the Internet 6.

(Configuration of Terminal Device 10)

The terminal device 10 is a user terminal such as a desktop PC (abbreviation of Personal Computer), a laptop PC, a tablet PC, or a smartphone. The terminal device 10 includes a display unit 12, a LAN interface 14, and a controller 20. The respective units 12 to 20 are connected to a bus line (reference sign thereof omitted). Hereinbelow, an interface will be denoted "I/F".

The display unit 12 is a display for displaying various types of information. The display unit 12 also functions as an operation unit (a so-called touch panel) for accepting user's instructions. In a variant, an operation unit such as a keyboard may be provided aside from the display unit 12. The LAN I/F 14 is an I/F for executing communication with the multi-function peripheral 100 and the like through the LAN 4.

The controller 20 includes a CPU 22 and a memory 24. The CPU 22 is configured to execute various processes according to programs 26, 28, 40 to 44 stored in the memory 24. The memory 24 stores an OS (abbreviation of Operating System) program 26 and a print scan application 28. Hereinbelow, an application will be denoted "app". The print scan app 28 is an application for causing an image processing device (such as 100) to execute print and scan, and is installed in the terminal device 10 from the application providing server 500 provided by a vendor of the image processing device on the Internet 6. In a variant, the print scan app 28 may be installed in the terminal device 10 from a medium shipped with the image processing device (such as 100).

The print scan app 28 secures a storage region in the memory 24 and stores an app information table 30 and target information 32 in this storage region. The app information table 30 is a table for storing app information related to respective plug-in apps which the print scan app 28 is capable of using. The target information 32 includes information (such as a model name) related to a target image processing device that is an image processing device which is to execute an image process in accordance with an instruction from the terminal device 10.

The memory 24 further stores plug-in apps 40 to 44 which the print scan app 28 is capable of using. In a state of FIG. 1, the memory 24 stores a business card print app 40, a book scan app 42, and a map print app 44. The business card print app 40 is an application for causing an image processing device to execute print of an image on a business card-size print medium. The book scan app 42 is an application for causing an image processing device to execute scan on a book. The map print app 44 is an application for causing an image processing device to execute print of an image representing a map. The respective plug-in apps 40 to 44 are installed in the terminal device 10 from the application providing server 500.

Aside from the respective plug-in apps 40 to 44, the vendor of image processing devices provides various plug-in apps including a CD label print app 46 and a photo print app 48. Aside from the respective plug-in apps 40 to 44, the application providing server 500 stores the CD label print app 46 and the photo print app 48. The CD label print app 46 is an application for causing an image processing device to execute print of an image on a CD. The photo print app 48 is an application for causing an image processing device to execute print of an image representing a photograph.

(App Information Table 30; FIG. 2)

Contents of the app information table 30 will be described with reference to FIG. 2. The app information table 30 stores app information corresponding to each of the one or more plug-in apps installed in the terminal device 10. Each of the app information includes an information number, an app ID (abbreviation of Identifier), an app name, a grayout flag, and a determination flag.

Each information number is a unique number given upon when the corresponding plug-in app is installed. Each app ID is an ID for identifying the corresponding plug-in app. Each app name is a name of the corresponding plug-in app. Each grayout flag is set to either one of values "ON" indicating that an icon indicative of the corresponding plug-in app is to be displayed in a grayout displaying state (that is, in a displaying state that is not capable of accepting a selecting operation) and "OFF" indicating that the icon indicative of the plug-in app is to be displayed in a normal displaying state (that is, in a displaying state that is capable of accepting the selecting operation). Each determination flag is set to either one of values "ON" indicating that a determination on whether the corresponding grayout flag is to be set in "ON" or "OFF" (see FIG. 6) has been executed and "OFF" indicating that this determination has not yet been executed.

(Configurations of Respective Image Processing Devices 100 to 400; FIG. 3)

As shown in FIG. 3, each of the image processing devices 100 to 400 is allocated with a model name (such as 100 to "Ink_mfp") and an IP address in the LAN 4 (such as "A1").

The multi-function peripheral 100 includes an inkjet scheme print mechanism and scan mechanisms for both an FB (abbreviation of FlatBed) scheme and an ADF (abbreviation of Auto Document Feeder) scheme. The multi-function peripheral 200 includes the same configuration as that of the multi-function peripheral 100 except for that it includes a laser scheme print mechanism. The scanner 300 includes the AFD scheme scan mechanism, and the printer 400 includes the inkjet scheme print mechanism.

The inkjet scheme is a scheme that prints an image by ejecting ink on a print medium. According to the inkjet scheme, an image can be printed not only on a sheet of plain paper generally used as a print medium but also on a special print medium (such as a business card-size print medium, a CD, etc.). Due to this, the multi-function peripheral 100 is capable of executing a print process of printing an image on a plain paper (such as a print process corresponding to the map print app 44 and the photo print app 48) as well as a print process of printing an image on a special print medium (such as a print process corresponding to the business card print app 40 and the CD label print app 46). In other words, the multi-function peripheral 100 provided with the inkjet scheme print mechanism is compliant with the business card print app 40, the map print app 44, the CD label print app 46, and the photo print app 48. Similarly, the printer 400 provided with the inkjet scheme print mechanism is also compliant with the respective plug-in apps 40, 44, 46, 48.

On the other hand, the laser scheme is a scheme that prints an image by causing toner to adhere to a surface of a photosensitive drum and transferring the toner on the photosensitive drum onto a print medium while the print medium makes contact with the photosensitive drum. According to the laser scheme, an image can be printed on a print medium (such as the plain paper) that can be conveyed along the photosensitive drum, but an image cannot be printed on a special print medium (such as the business card-size print medium, the CD, etc.) that cannot be conveyed along the photosensitive drum. That is, the multi-function peripheral 200 provided with the laser scheme print mechanism is compliant with the map print app 44 and the photo print app 48, but is not compliant with the business card print app 40 and the CD label print app 46.

The FB scheme is a scheme that scans a document placed on a transparent plate. According to the FB scheme, a book in which plural sheets of papers are bound can be scanned. Due to this, the multi-function peripherals 100, 200 are capable of executing a scan process of scanning a book (that is, a scan process corresponding to the book scan app 42). Due to this, the multi-function peripherals 100, 200 provided with the FB scheme scan mechanism are compliant with the book scan app 42.

On the other hand, the ADF scheme is a scheme that scans a document while conveying a scan target document. According to the ADF scheme, a book, which is not conveyable, cannot be scanned. Due to this, the scanner 300, which is provided with the ADF scheme scan mechanism but not provided with the FB scheme scan mechanism, is not compliant with the book scan app 42.

(Configuration of Application Providing Server 500)

As shown in FIG. 1, the application providing server 500 stores the various applications 28, 40 to 48. The application providing server 500 is configured to send an application to the terminal device 10 in accordance with a request from the terminal device 10.

(Configuration of List Providing Server 600)

The list providing server 600 stores a compliance list table 630. The list providing server 600 is configured to send a compliance list included in the compliance list table 630 to the terminal device 10 in accordance with a request from the terminal device 10. Each of the aforementioned servers 500, 600 is provided on the Internet 6 by the vendor of the image processing devices 100 to 400 in this embodiment, however, in a variant, they may be provided by a business entity different from the vendor.

(Compliance List Table 630; FIG. 2)

Contents of the compliance list table 630 will be described with reference to FIG. 2. The compliance list table 630 stores the app ID, the app name, and a compliance list in association with each other for each of the plurality of plug-in apps. Each compliance list is a list of the model names of image processing devices that are compliant with the corresponding plug-in app identified by the app ID and the app name. For example, as aforementioned, the business card print app 40 is compliant with the multi-function peripheral 100 and the printer 400, but is not compliant with the multi-function peripheral 200 and the scanner 300. Due to this, a compliant list corresponding to the app name "business card print" includes the model name "Ink_mfp" of the multi-function peripheral 100 and the model name "Ink_print" of the printer 400, but does not include the model name "Lz_mfp" of the multi-function peripheral 200 nor the model name "ADF_scan" of the scanner 300.

(Process in Terminal Device; FIG. 4)

Contents of a process which the CPU 22 of the terminal device 10 executes in accordance with the print scan app 28 will be described with reference to FIG. 4. The process of FIG. 4 is initiated with an activation of the print scan app 28 as a trigger.

In S10, the CPU 22 determines whether or not a target image processing device (hereinbelow denoted as a "target device") that is to execute an image process (that is, a print process and a scan process) in accordance with an instruction from the terminal device 10 has been designated by a user. Specifically, the CPU 22 determines whether or not each of information (the model name, the IP address, and function information) related to the target device is stored in the memory 24 as the target information 32. Here, the function information indicates a function which the image processing device is capable of executing (that is, at least one of the print function and the scan function). In a case of determining that the target information 32 is stored in the memory 24 (YES in S10), the CPU 22 skips processes of S12 to S24 and proceeds to S40. In a case of determining that the target information 32 is not stored in the memory 24 (NO in S10), the CPU 22 proceeds to S12.

In S12, the CPU 22 displays a default menu screen MS0 on the display unit 12. The menu screen MS0 includes a print icon I20 indicating the print function, a scan icon I21 indicating the scan function, an install icon I40 indicating an installation process of a plug-in app, and icons I30 to I32 respectively indicating the plug-in apps 40 to 44 installed in the terminal device 10. The menu screen MS0 further includes a device designation icon I50 for designating a target device. Each of the icons I20, I21, I30 to I32, I40, I50 has the normal displaying state (that is, the displaying state that is capable of accepting a selecting operation). Hereinbelow, the print icon I20 and the scan icon I21 will be denoted collectively as "function icons", and the respective icons (such as a business card icon I30) indicating the plug-in apps will be denoted collectively as "app icons". Further, hereinbelow, an app icon indicating the business card print app 40 will be denoted as "business card icon" by using the initial wording "business card" in the app name, and the app icons for the other plug-in apps will be denoted according to the same rule.

In S14, the CPU 22 monitors whether one of the respective icons I20, etc., other than the install icon I40, included in the menu screen MS0 is selected by the user. Although not shown, in a case where the install icon I40 is selected by the user, the CPU 22 executes an installation process for installing an additional application (such as the CD label print app 46) and returns to S12. The installation process is similar to S132 to S138 of FIG. 7 to be described later.

In a case where one icon (such as I30) other than the install icon I40 is selected by the user (YES in S14), the CPU 22 broadcasts a search signal to the LAN 4 in S16 through the LAN I/F 14. The search signal is a signal for requesting each image processing device to send a response signal including information of the image processing device (that is, the model name, the IP address, and the function information thereof).

In S18, the CPU 22 uses one or more response signals received from one or more image processing devices connected to the LAN 4 to display a device designation screen for designating a target device from among the one or more image processing devices on the display unit 12. The device designation screen includes a list of one or more model names included in the one or more response signals.

In S20, the CPU 22 monitors whether or not one model name is designated by the user from the list of the one or more model names included in the device designation screen. In a case where one model name is designated, the CPU 22 determines YES in S20 and proceeds to S22.

In S22, the CPU 22 specifies the response signal including the model name selected in S20 from among the one or more response signals received in S16, and registers the respective types of information (that is, the model name, the IP address, and the function information) included in the specified response signal as the target information 32 in the memory 24. When the print scan app 28 is to be activated the next time or thereafter, the target information 32 is already registered in the memory 24, so the CPU 22 determines YES in S10.

In S24, the CPU 22 sets the grayout flag and the determination flag to "OFF" for all the app information in the app information table 30. When S24 is completed, the CPU 22 proceeds to S40.

The CPU 22 executes a function icon process (see FIG. 5) in S40, and then executes an application specifying process (see FIG. 6) in S60. The function icon process is a process for determining whether or not the respective function icons I20, I21 are to be displayed. The application specifying process is a process for specifying an app that is not compliant with the target device and setting the grayout flag corresponding to this app to "ON" in the app information table 30.

Next, in S90, the CPU 22 displays a menu screen different from the default menu screen MS0 on the display unit 12 based on results of the processes of S40 and S60. For example, in a case where it is determined that the print icon I20 is to be displayed and the scan icon I21 is not to be displayed in the process of S40, the CPU 22 displays a menu screen including the print icon I20 but not including the scan icon I21. For example, in a case where the grayout flag corresponding to the book scan app 42 is set to "ON" in the app information table 30 in the process of S60, the CPU 22 displays a menu screen including a book icon I31 having a grayed-out displaying state.

In S100, the CPU 22 executes a selection monitoring process (see FIG. 7) for monitoring whether one icon included in the menu screen displayed in S90 is selected by the user. When S100 is completed, the CPU 22 returns to S10.

For example, a comparative example may be assumed in which the processes of S16 to S24 are omitted in the case where one of the app icons I30 to I32 included in the default menu screen MS0 is selected by the user, and the plug-in app indicated by the selected app icon is activated. In this comparative example, the plug-in app is activated in a state where a target device has not been designated by the user. When a target device is designated thereafter, the target device may not be compliant with the already-activated plug-in app. That is, according to the comparative example, the plug-in app may possibly be activated unnecessarily. Contrary to this, in the present embodiment, the processes of S16 to S24 are executed without activating the plug-in app, and then a target device is designated by the user. Due to this, the plug-in app can be prevented from being activated unnecessarily. In a variant, the configuration of the above comparative example may be employed.

Figure 5:
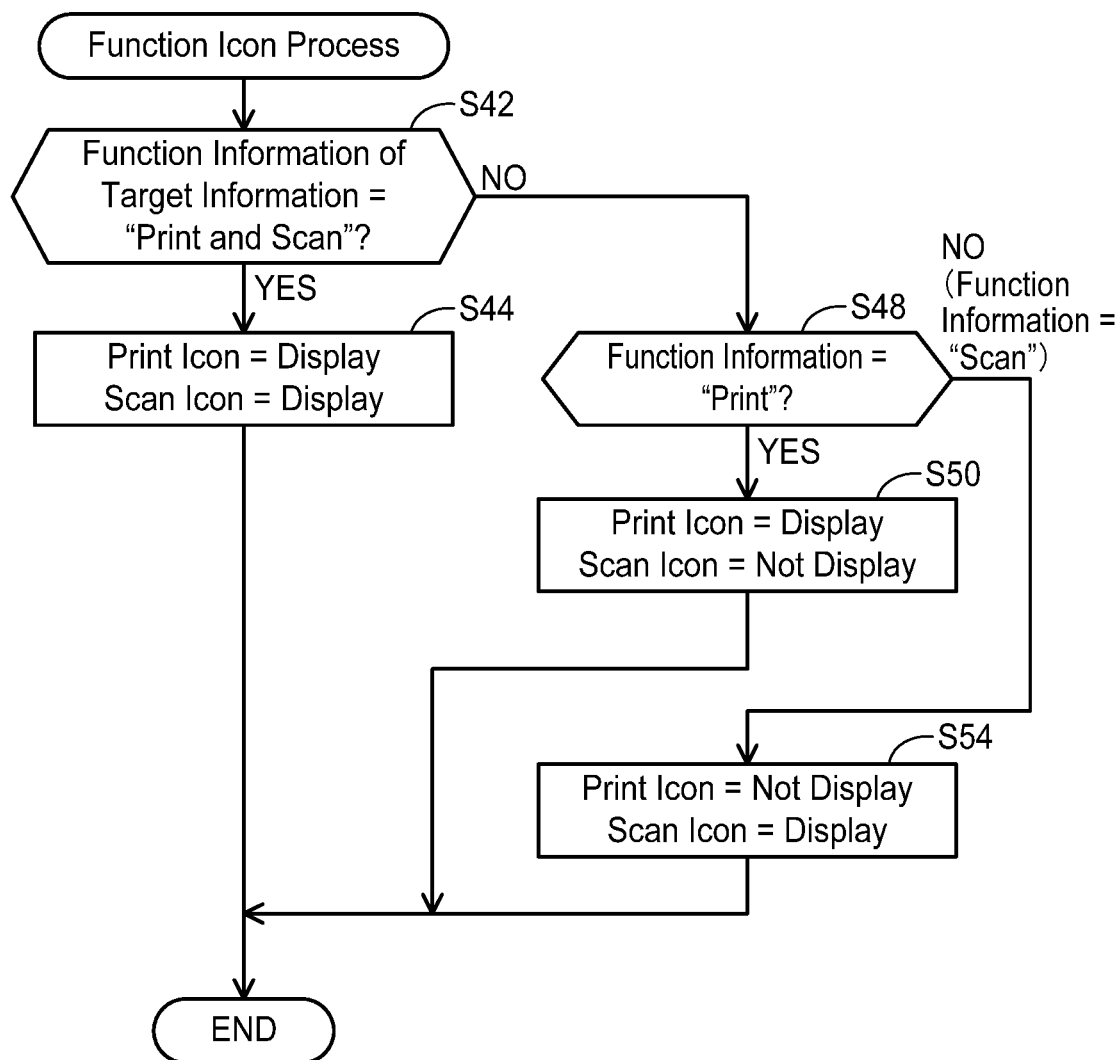
FIG. 5 shows a flowchart of a function icon process.

(Function Icon Process; FIG. 5)

The function icon process (see S40 of FIG. 4) will be described with reference to FIG. 5. In S42, the CPU 22 determines whether or not the function information included in the target information 32 in the memory 24 indicates both the print function and the scan function. In a case of determining that the function information indicates both the print function and the scan function (YES in S42), the CPU 22 proceeds to S44. In a case of determining that function information indicates one of the print function and the scan function (NO in S42), the CPU 22 proceeds to S48.

In S44, the CPU 22 determines to display the print icon I20 and the scan icon I21 When S44 is completed, the process of FIG. 5 is completed.

In S48, the CPU 22 determines whether or not the function information included in the target information 32 in the memory 24 indicates only the print function. In a case of determining that the function information indicates only the print function (YES in S48), the CPU 22 proceeds to S50. In a case of determining that the function information indicates only the scan function (NO in S48), the CPU 22 proceeds to S54.

In S50, the CPU 22 determines to display the print icon I20 and not to display the scan icon I21. When S50 is completed, the process of FIG. 5 is completed.

In S54, the CPU 22 determines to display the scan icon I21 and not to display the print icon I20. When S54 is completed, the process of FIG. 5 is completed.

When the process of FIG. 5 is executed, the print icon I20 is determined to be displayed or not displayed, and the scan icon I21 is determined to be displayed or not displayed. Then, in S90 of FIG. 4, a menu screen, which includes the icon(s) determined to be "displayed" but does not include the icon(s) determined to be "not displayed", is displayed.

Figure 6:
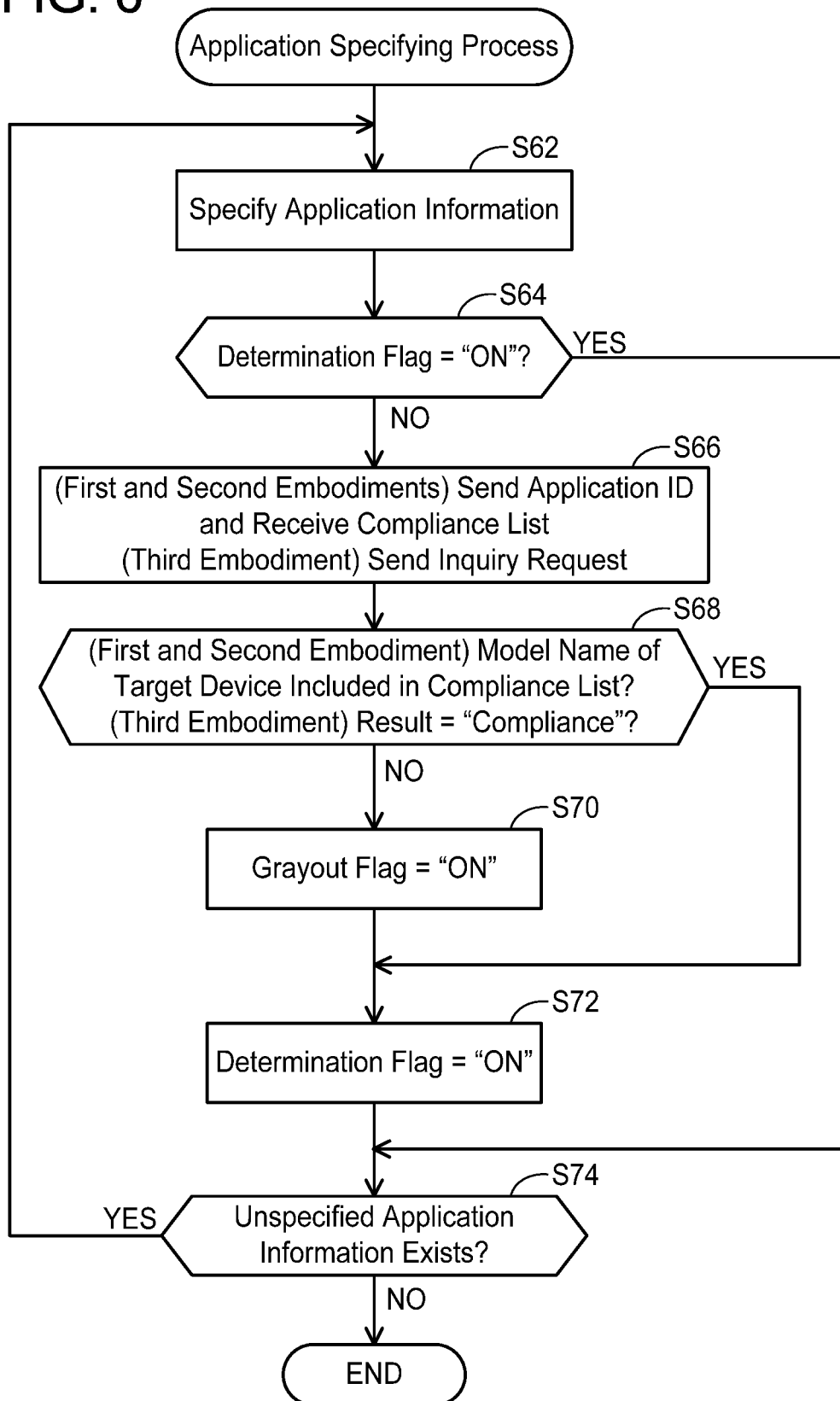
FIG. 6 shows a flowchart of an application specifying process.

(Application Specifying Process; FIG. 6)

The application specifying process (see S60 of FIG. 4) will be described with reference to FIG. 6. In S62, the CPU 22 specifies one app information from among all the app information in the app information table 30. Hereinbelow, the app information specified here will be termed "specified app information".

In S64, the CPU 22 determines whether or not the determination flag included the specified app information indicates "ON". In a case of determining that the determination flag indicates "ON" (YES in S64), the CPU 22 skips processes of S66 to S72 and proceeds to S74. In a case of determining that the determination flag indicates "OFF" (NO in S64), the CPU 22 proceeds to S66.

In S66, the CPU 22 sends the app ID included in the specified app information to the list providing server 600 through the LAN I/F 14 and the Internet 6. As a result, the CPU 22 receives a compliance list corresponding to the sent app ID from the list providing server 600.

In S68, the CPU 22 determines whether or not the model name included in the target information 32 (that is, the model name of the target device) in the memory 24 is included in the received compliance list. In a case of determining that the model name included in the target information 32 is included in the received compliance list (YES in S68), the CPU 22 skips S70 and proceeds to S72. On the other hand, in a case of determining that the model name included in the target information 32 is not included in the received compliance list (NO in S68), the CPU 22 changes the grayout flag included in the specified app information in the app information table 30 from "OFF" to "ON" in S70.

In S72, the CPU 22 changes the determination flag included in the specified app information in the app information table 30 from "OFF" to "ON".

In S74, the CPU 22 determines whether or not app information that has not yet been specified in S62 exists among all the app information in the app information table 30. In a case of determining that there still is unspecified app information (YES in S74), the CPU 22 returns to S62, newly specifies app information, and executes the processes of S64 and the subsequent steps again. On the other hand, in a case of determining that there is no more unspecified app information (NO in S74), the CPU 22 completes the process of FIG. 6.

For example, a comparative example may be assumed in which no determination flag is stored in the app information table 30. In this case, S64 and S72 of FIG. 6 are omitted. Further, for example, a situation may be assumed in which after S10 to S60 of FIG. 4 have been executed in response to the activation of the print scan app 28 and the menu screen has been displayed in S90, S10, S40, and S60 of FIG. 4 are executed again in response to re-activation of the print scan app 28 and a menu screen is displayed again in S90. In this case, the processes from S66 to S70 of FIG. 6 are executed by using the app information at a timing of the initial activation of the print scan app 28, and the processes of S66 to S70 are executed again by using the same app information at a timing of the latter activation of the print scan app 28. That is, according to the comparative example, the same processes (that is, S66 to S70) are repeatedly executed by using the same app information. Contrary to this, in the present embodiment, when the CPU 22 executes the processes from S66 to S70 at the timing of the initial activation, it sets the determination flag included in the app information to "ON" in S72. Due to this, the CPU 22 determines YES in S64 at the timing of the latter activation and does not execute the processes of S66 to S70. Since the processes of S66 to S70 are not repeatedly executed by using the same app information, processing load can be reduced. In a variant, the configuration of the comparative example may be employed.

Further, for example, a comparative example may be assumed in which when a plug-in app is installed to the terminal device 10, a compliance list corresponding to this plug-in app is received from the list providing server 600 and this compliance list is stored in the memory 24. In this case, the process of S66 is omitted, and the determination is made in S68 by using the compliance list stored in the memory 24. However, in the list providing server 600, the compliance list may be updated. Due to this, the determination can be executed in S68 by using an old compliance list instead of a latest compliance list. As a result, the determination on whether or not the target device is compliant with the plug-in app may not be executed appropriately. Contrary to this, in the present embodiment, the CPU 22 can execute the process of S68 by using the latest compliance list by receiving the latest compliance list from the list providing server 600 (S66). As a result, the CPU 22 can appropriately determine whether or not the target device is compliant with the plug-in app. In a variant, the configuration of the comparative example may be employed.

Figure 7:
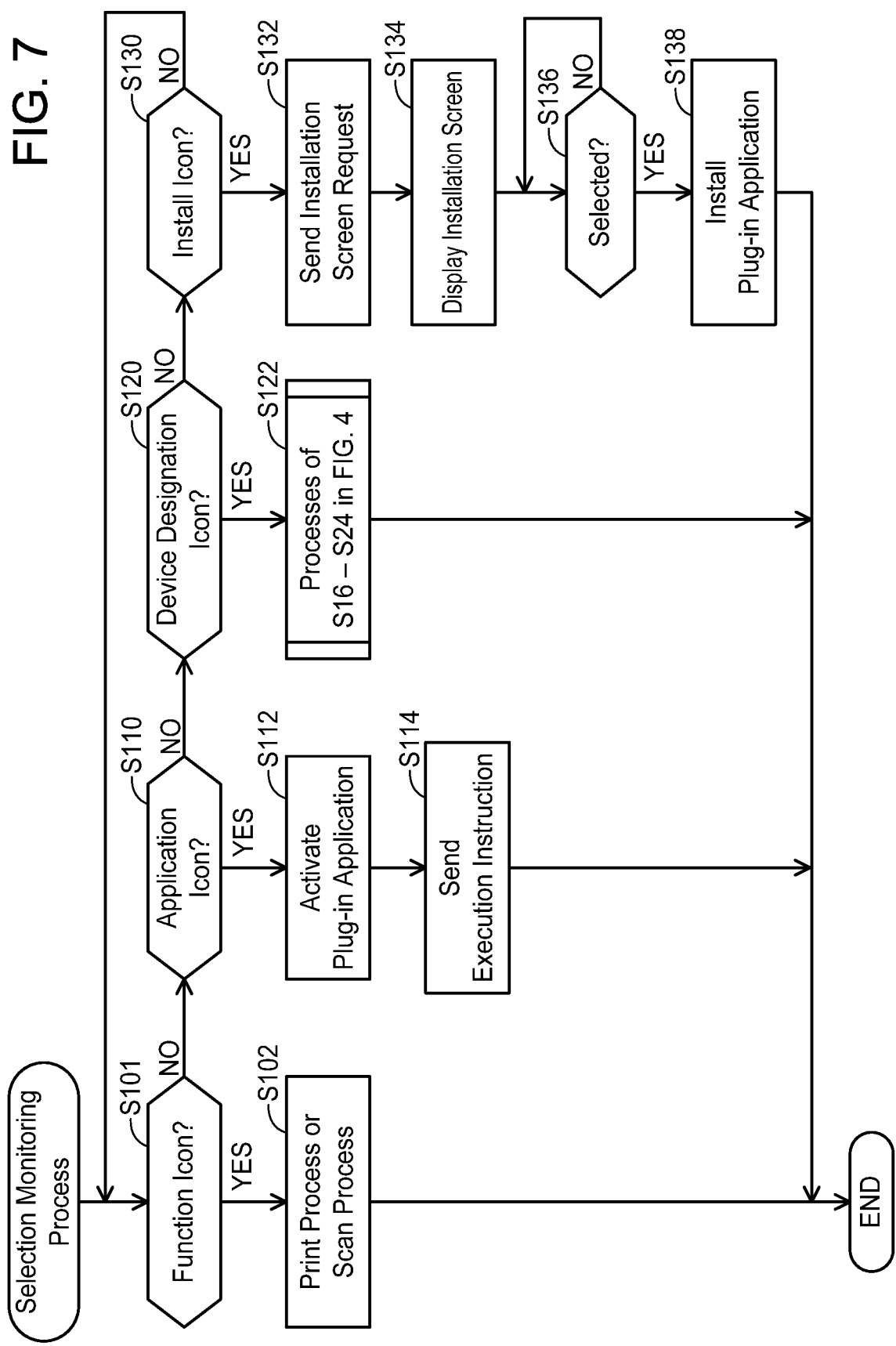
FIG. 7 shows a flowchart of a selection monitoring process.

(Selection Monitoring Process; FIG. 7)

The selection monitoring process (see S100 of FIG. 4) will be described with reference to FIG. 7. The CPU 22 monitors whether the function icon, the app icon, the device designation icon, and the install icon in the menu screen are selected respectively in S101, S110, S120, and S130.

In a case where the function icon is selected, the CPU 22 determines YES in S101 and causes the target device to execute the print process or the scan process corresponding to the function icon in S102. For example, in a case where the print icon I20 is selected, the CPU 22 displays a selection screen for selecting a print target image on the display unit 12. Then, when the print target image is selected, the CPU 22 sends a print execution instruction for instructing print of the selected image to the target device with the IP address included in the target information 32 as a destination, without using any of the plug-in apps. By so doing, the print process of the selected image is executed in the target device. Further, for example, in a case where the scan icon I21 is selected, the CPU 22 sends a scan execution instruction to the target device with the IP address included in the target information 32 as the destination, without using any of the plug-in apps. By so doing, the scan process on a target document is executed in the target device, and image data generated by the scan process is sent to the terminal device 10. When the process of S102 is completed, the process of FIG. 7 is completed.

In a case where the app icon is selected, the CPU 22 determines YES in S110, and activates the plug-in app indicated by the selected app icon in S112. Then, in S114, the CPU 22 sends an execution instruction for an image process corresponding to the activated plug-in app to the target device with the IP address included in the target information 32 as the destination. For example, in a case where the business card icon I30 is selected (YES in S110), the CPU 22 activates the business card print app 40 (S112), and displays an editor screen for an image to be printed on the business card-size print medium on the display unit 12 in accordance with the business card print app 40. Then, the CPU 22 sends the print execution instruction for instructing print of the edited image to the target device (S114). Due to this, the print process for the image on the business card-size print medium is executed in the target device, by which a business card is created. When the process of S114 is completed, the process of FIG. 7 is completed.

In a case where the device designation icon ISO is selected, the CPU 22 determines YES in S120 and proceeds to S122. S122 is similar to S16 to S24 of FIG. 4. In this case, in S22, target information 32 of a newly designated target device is registered as a substitution of the old target information 32 in the memory 24. When the process of S122 is completed, the process of FIG. 7 is completed.

In a case where the install icon I40 is selected, the CPU 22 determines YES in S130 and sends an installation screen request for requesting installation screen data to the application providing server 500 in S132. The installation screen data is data representing an installation screen for installing a plug-in app. The installation screen data includes a list of the app names of all the plug-in apps stored in the application providing server 500.

In S134, the CPU 22 specifies app names that are not included in the app information table 30 from the list of app names of all the plug-in apps included in the installation screen data. Then, the CPU 22 displays an installation screen including a list of the specified app names (that is, the app names of plug-in apps that are not installed in the terminal device 10) on the display unit 12.

In S136, the CPU 22 monitors whether one of the app names is selected by the user from the list in the installation screen. In a case where one of the app names is selected by the user, the CPU 22 determines YES in S136 and proceeds to S138.

In S138, the CPU 22 requests the application providing server 500 to send a plug-in app indicated by the selected app name, and receives this plug-in app from the application providing server 500. Then, the CPU 22 stores this plug-in app in the memory 24 (that is, this plug-in app is installed to the terminal device 10). When the process of S138 is completed, the process of FIG. 7 is completed.

Figure 8:
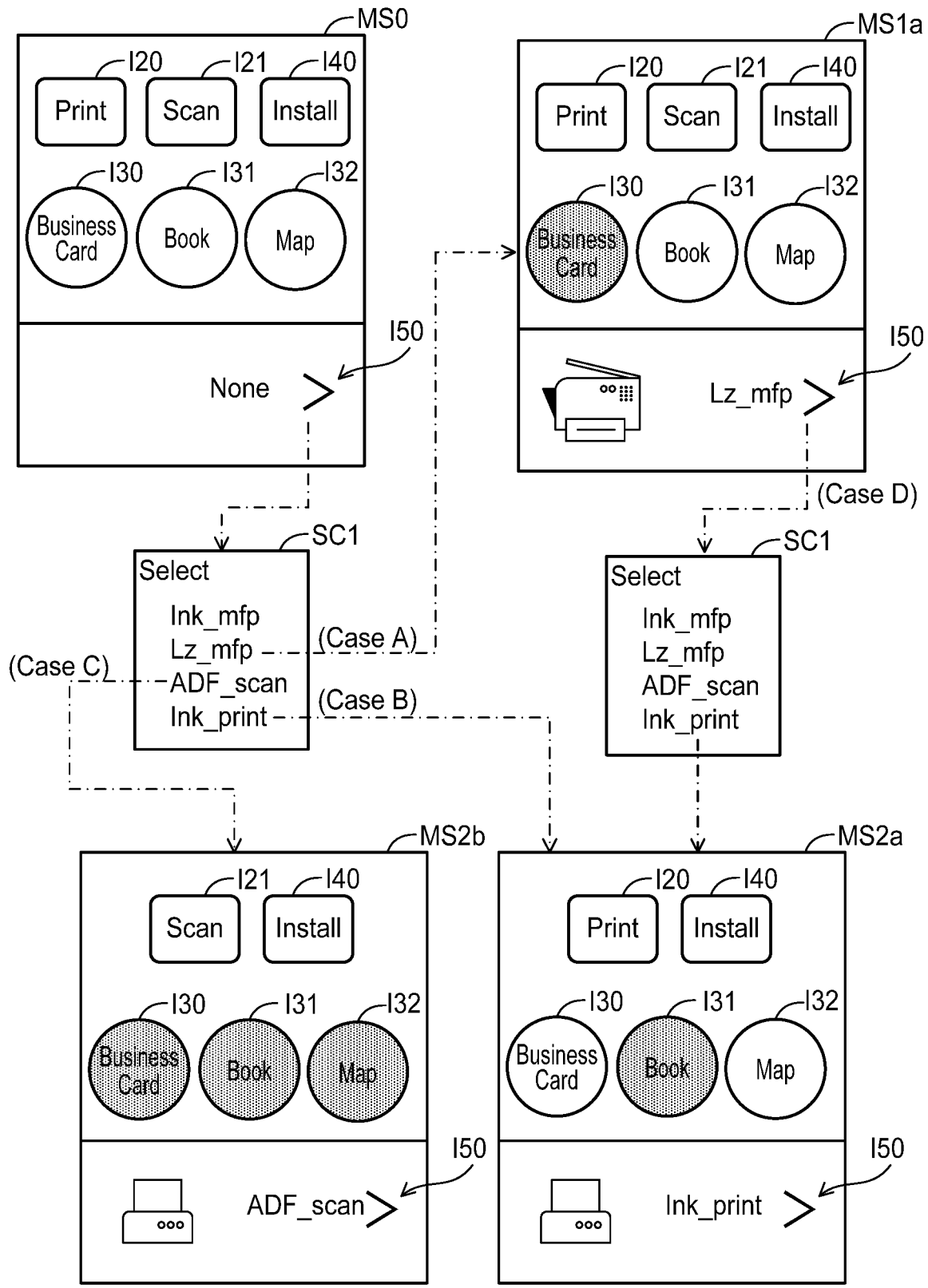
FIG. 8 shows specific examples of a menu screen displayed in a case where an image processing device is designated.

(Specific Examples of Menu Screen; FIG. 8)

Specific examples of the menu screen displayed according to the process of FIG. 4 will be described with reference to FIG. 8. For example, in the situation where the print scan app 28 and the respective plug-in apps 40 to 44 are installed in the terminal device 10 and a target device has not yet been designated, the terminal device 10 displays the default menu screen MS0 (NO in S10, and S12 of FIG. 4). The user selects the device designation icon ISO in the menu screen MS0 to designate a target device (YES in S14). Due to this, the terminal device 10 displays a device designation screen SC1 including the model names of the respective image processing devices 100 to 400 connected to the LAN 4 (S18).

In Case A, the user designates the model name "Lz_mfp" of the multi-function peripheral 200 from the device designation screen SC1. In this case, the terminal device 10 stores target information 32 including the model name "Lz_mfp" (S22), and displays a menu screen MS1a (S90). Since the multi-function peripheral 200 which is capable of executing both the print function and the scan function has been designated, the function information included in the target information 32 indicates both the print function and the scan function (YES in S42 of FIG. 5), as a result of which the terminal device 10 determines that the print icon I20 and the scan icon I21 are to be displayed (S44). Due to this, the menu screen MS1a includes the print icon I20 and the scan icon I21.

The terminal device 10 further determines that the model name "Lz_mfp" of the multi-function peripheral 200 is not included in the compliance list corresponding to the business card print app 40 (NO in S68 of FIG. 6), and sets the grayout flag corresponding to the business card print app 40 to "ON" (S70). On the other hand, the terminal device 10 determines that the model name "Lz_mfp" is included in each of the compliance lists of the book scan app 42 and the map print app 44 (YES in S68), and maintains the grayout flags corresponding to these plug-in apps 42, 44 to "OFF". As a result, the menu screen MS1a includes the business card icon I30 having the grayed-out displaying state and the book icon I31 and the map icon I32 having the normal displaying state.

As aforementioned, since the business card icon I30 has the grayed-out displaying state, the user cannot select the business card icon I30 to activate the business card print app 40. Due to this, the print execution instruction for instructing print of an image on the business card-size print medium can be prevented from being sent to the multi-function peripheral 200 when the multi-function peripheral 200 is not compliant with the business card print app 40. In a case where an app icon having the grayed-out displaying state (which is herein the business card icon I30) is selected, the CPU 22 may display on the display unit 12 a message notifying that the image process corresponding to the app icon cannot be executed in the target device.

Here, a comparative example is assumed in which a menu screen that does not include the business card icon I30 is displayed. In this case, the user cannot recognize from the menu screen whether or not the business card print app 40 is installed in the terminal device 10. Contrary to this, in the present embodiment, the menu screen MS1a includes the business card icon I30 having the grayed-out displaying state. Due to this, the user can recognize, from the menu screen MS1a, that the business card print app 40 is installed in the terminal device 10 but the business card print app 40 is not compliant with the target device (that is, the multi-function peripheral 200). In a variant, the configuration of the comparative example may be employed.

In Case B, the user designates the model name "Ink_print" of the printer 400 in the service designation screen SC1. In this case, the terminal device 10 stores target information 32 including the model name "Ink_print" (S22) of FIG. 4), and displays a menu screen MS2a (S90). Since the printer 400 which is capable of executing only the print function has been designated, the function information included in the target information 32 indicates only the print function (YES in S48 of FIG. 5), as a result of which the terminal device 10 determines that the print icon I20 is to be displayed and the scan icon I21 is not to be displayed (S50). Due to this, the menu screen MS2a includes the print icon I20 but does not include the scan icon I21. The user can recognize that the target device (that is, the printer 400) is not capable of executing the scan function from the menu screen MS2a that does not include the scan icon I21.

The terminal device 10 further determines that the model name "Ink_print" of the printer 400 is not included in the compliance list corresponding to the book scan app 42 (NO in S68 of FIG. 6), and determines that the model name "Ink_print" is included in each of the compliance lists of the business card print app 40 and the map print app 44 (YES in S68 of FIG. 6). As a result, the menu screen MS2a includes the book icon I31 having the grayed-out displaying state and the business card icon I30 and the map icon I32 having the normal displaying state.

In Case C, the user designates the model name "ADF_scan" of the scanner 300 in the service designation screen SC1. In this case, the terminal device 10 stores target information 32 including the model name "ADF_scan" (S22 of FIG. 4), and displays a menu screen MS2b (S90). Since the scanner 300 which is capable of executing only the scan function has been designated, the function information included in the target information 32 indicates only the scan function (NO in S48 of FIG. 5), as a result of which the terminal device 10 determines that the print icon I20 is not to be displayed and the scan icon I21 is to be displayed (S54). Due to this, the menu screen MS2b does not include the print icon I20 and includes the scan icon I21. The user can recognize that the target device (that is, the scanner 300) is not capable of executing the print function from the menu screen MS2b that does not include the print icon I20.

The terminal device 10 further determines that the model name "ADF_scan" of the scanner 300 is not included in any of the compliance lists corresponding to the respective plug-in apps 40 to 44 (NO in S68 of FIG. 6). As a result, the menu screen MS2b includes the app icons I30 to I32 having the grayed-out displaying state.

In Case D, the user selects the device designation icon ISO in the menu screen MS1a, and further designates the model name "Ink_print" of the printer 400 in the device designation screen SC1. In this case, the terminal device 10 stores the target information 32 including the model name "Ink_print" as a substitution to the target information 32 including the model name "Lz_mfp" (S22 of FIG. 4), and displays the menu screen MS2a as a substitution to the menu screen MS1a (S90). As above, when the designated target device is changed by the user, the terminal device 10 accordingly changes the displaying states of the app icons included in the menu screen. Due to this, in the case where the target device is changed, an execution instruction of an image process corresponding to a plug-in app not compliant with the target device after the change can be prevented from being sent to the target device after the change.

Figure 9:
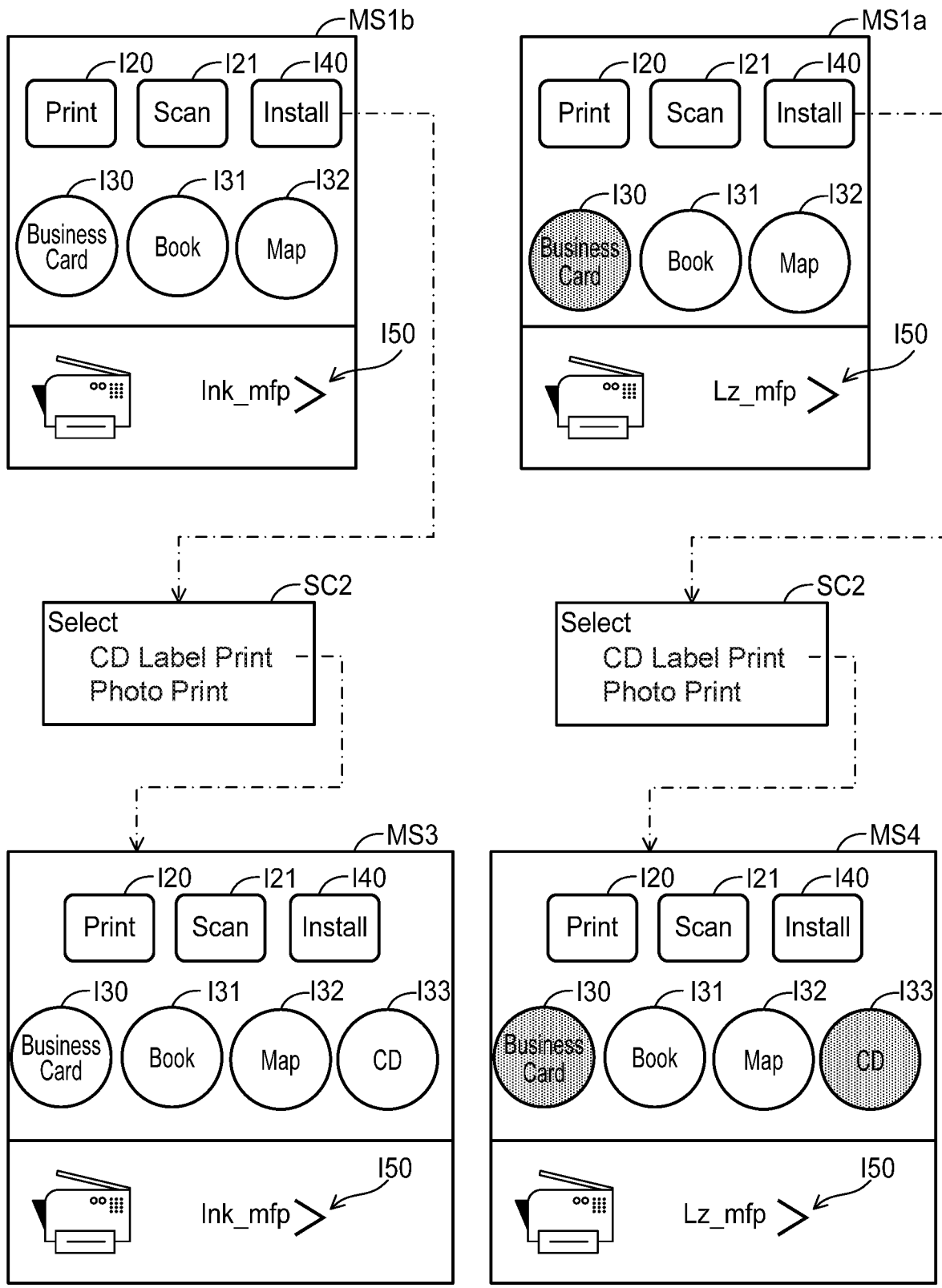
FIG. 9 shows specific examples of a menu screen displayed in a case where an additional plug-in application is installed.

(Specific Examples of Menu Screen; FIG. 9)

Specific examples of the menu screen displayed in accordance with the process of FIG. 4 in a case where an additional plug-in app is installed will be described with reference to FIG. 9.

In one case, the multi-function peripheral 100 having the model name "Ink_mfp" is designated as the target device. In this case, the terminal device 10 displays a menu screen MS1b (S90 of FIG. 4). Since the model name "Ink_mfp" is included in each of the compliance lists corresponding to the respective plug-in apps 40 to 44 (YES in S68 of FIG. 6), the menu screen MS1b includes the app icons I30 to I32 having the normal displaying state.

The user selects the install icon I40 in the menu screen MS1b to install an additional plug-in app (YES in S130 of FIG. 7). Due to this, the terminal device 10 displays an installation screen SC2 (S134). The user selects the app name "CD label print" in the installation screen SC2 (YES in S136 of FIG. 7). Due to this, the CD label print app 46 is installed in the terminal device 10 (S138).

When the CD label print app 46 is installed, the terminal device 10 executes the process of FIG. 4 again and displays a menu screen MS3 as a substitution to the menu screen MS1*b* (S90 of FIG. 4). Since the model name "Ink_mfp" is included in the compliance list corresponding to the CD label print app 46 (YES in S68 of FIG. 6), the menu screen MS3 includes a CD icon I33 having the normal displaying state.

In another case, the multi-function peripheral 200 having the model name "Lz_mfp" is designated as the target device. In this case, the terminal device 10 displays the menu screen MS1*a* (S90 of FIG. 4).

The user selects the install icon I40 in the menu screen MS1*a* (YES in S130 of FIG. 7), and selects the app name "CD label print" in the installation screen SC2 (YES in S136). Due to this, the CD label print app 46 is installed in the terminal device 10 (S138).

When the CD label print app 46 is installed, the terminal device 10 executes the process of FIG. 4 again and displays a menu screen MS4 as a substitute to the menu screen MS1*a* (S90 of FIG. 4). Since the model name "Lz_mfp" is not included in the compliance list corresponding to the CD label print app 46 (NO in S68 of FIG. 6), the menu screen MS4 includes the CD icon I33 having the grayed-out displaying state.

According to the specific examples, in the case where the CD label print app 46 being the additional plug-in app is compliant with the multi-function peripheral 100 being the target device, the terminal device 10 displays the menu screen MS3. Due to this, in a case where the app icon I33 in the menu screen MS3 is selected, the terminal device 10 can suitably send to the multi-function peripheral 100 an execution instruction for image process corresponding to the CD label print app 46. On the other hand, in the case where the CD label print app 46 is not compliant with the multi-function peripheral 200 being the target device, the terminal device 10 displays the menu screen MS4. Since the app icon I33 in the menu screen MS4 is not selected, an execution instruction for image process corresponding to the CD label print app 46 can be prevented from being sent to the multi-function peripheral 200 when the multi-function peripheral 200 is not compliant with the CD label print app 46.

(Corresponding Relationships)

The image processing devices 100 to 400 of FIG. 1, the multi-function peripheral 200 designated in the menu screen MS1*a* of FIG. 8, and the model name "Lz_mfp" are respectively examples of "one or more image processing devices", "first image processing device", and "first device information". The plug-in apps 40 to 44 of FIG. 1, the menu screen MS1*a* of FIG. 8, the app icons I31 and I32 in the menu screen MS1*a*, the book scan app 42 and the map print app 44, and the business card print app 40 are respectively examples of "M applications", "first menu screen", "N icons", "N applications", and "(M-N) applications". The normal displaying state and the grayed-out displaying state are respectively examples of "first type of displaying state" and "second type of displaying state". The compliance list of FIG. 2 is an example of "specification information". The menu screen MS0 of FIG. 8 and the device designation screen SC1 of FIG. 8 are respectively examples of "specific menu screen" and "designation screen". The printer 400 designated in the menu screen MS2*a* of FIG. 8 and the model name "Ink_print" are respectively examples of "second image processing device" and "second device information". The menu screen MS2*a* of FIG. 8, the app icons I30 and I32 in the menu screen MS2*a*, the business card print app 40 and the map print app 44, and the book scan app 42 are respectively examples of "second menu screen", "L icons", "L applications", and "(M-L) applications". The menu screen MS3 of FIG. 9, the menu screen MS4 of FIG. 9, and the CD label print app 46 are respectively examples of "third menu screen" "fourth menu screen", and "additional application".

S22, S60, and S90 of FIG. 4 are respectively examples of "registering first device information of a first image processing device", "specifying N (or L) applications corresponding to one or more types of image processes that the first (or second) image processing device is capable of executing", and "displaying a first (or any of second to fourth) menu screen on a display unit". S12, S16, and S18 of FIG. 4 are respectively examples of "displaying a specific menu screen on the display unit", "receiving function information indicating a function that the first image processing device is capable of executing", and "displaying a designation screen for designating the first image processing device". S114 and S102 of FIG. 7 are respectively examples of "sending an execution instruction to the first image processing device" and "sending an execution instruction for the print (or scan) function to the first image processing device". S68 of FIG. 6 and S122 of FIG. 7 are respectively examples of "determining whether the first image processing device is capable of executing an image process corresponding to the additional application" and "registering second device information".

Second Embodiment

In the first embodiment, after the default menu screen MS0 is displayed (S12 of FIG. 4), one icon other than the install icon is selected, and a target device is designated (S20), a menu screen based on results of the processes of S40 and S60 is displayed (S90). The present embodiment differs from the first embodiment in that a process based on a type of the icon selected in the default menu screen MS0 is executed after the target device has been designated and before the menu screen is displayed again.

In the present embodiment, a switching process (see FIG. 10) is executed in S200 after S24 of FIG. 4. The switching process is a process for switching processes based on the icon selected in S14 (hereinbelow termed "selected icon"). When S200 is completed, the CPU 22 returns to S10.

Figure 10:
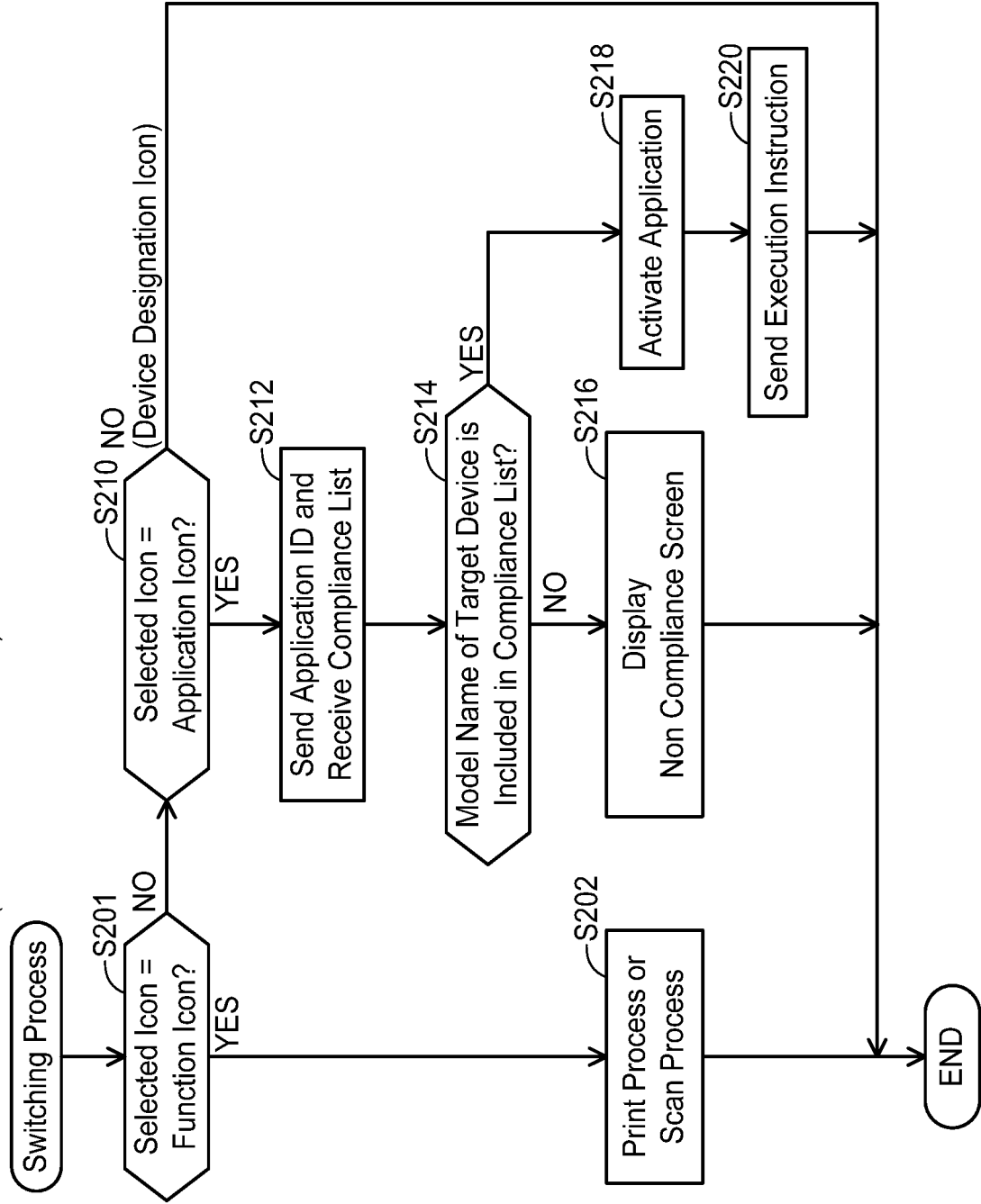
FIG. 10 shows a flowchart of a switching process.

(Switching Process; FIG. 10)

The switching process (see S200 of FIG. 4) will be described with reference to FIG. 10. In S201, the CPU 22 determines whether or not the selected icon is a function icon (such as I20). In a case of determining that the selected icon is a function icon (YES in S201), the CPU 22 proceeds to S202. In a case of determining that the selected icon is not a function icon (NO in S201), the CPU 22 proceeds to S210.

S202 is similar to S102 of FIG. 7. That is, after a target device has been designated by the processes of S16 to S22 of FIG. 4, the terminal device 10 causes the target device to execute the print process or the scan process corresponding to the function icon selected in S14, without displaying a menu screen again. In the first embodiment in which a menu screen is displayed again after the processes of S16 to S22 of FIG. 4, the user needs to select the same function icon twice to cause the target device to execute the print process or the scan process corresponding to the function icon. Contrary to this, in the present embodiment, the user simply needs to select the function icon once. Convenience for the user is improved. When S202 is completed, the process of FIG. 10 is completed.

Further, in S210, the CPU 22 determines whether or not the selected icon is an app icon. In a case of determining that the selected icon is an app icon (YES in S210), the CPU 22 proceeds to S212. On the other hand, in a case of determining that the selected icon is not an app icon (that is, the selected icon is the device designation icon; NO in S210), the CPU 22 skips processes of S212 to S220 and completes the process of FIG. 10.

S212 is similar to S66 of FIG. 6, except that the app ID of the plug-in app indicated by the selected icon is acquired from the app information table 30 and the acquired app ID is sent to the list providing server 600. S214 is similar to S68 of FIG. 6.

In a case of determining that the model name included in the target information 32 is not included in the received compliance list (NO in S214), the CPU 22 displays a noncompliance screen indicating that the target device is not compliant with the plug-in app indicated by the selected icon on the display unit 12. When the process of S216 is completed, the process of FIG. 10 is completed.

In a case of determining that the model name included in the target information 32 is included in the received compliance list (YES in S214), the CPU 22 proceeds to S218. S218 and S220 are similar to S112 and S114 of FIG. 7. When the process of S220 is completed, the process of FIG. 10 is completed.

Figure 11:
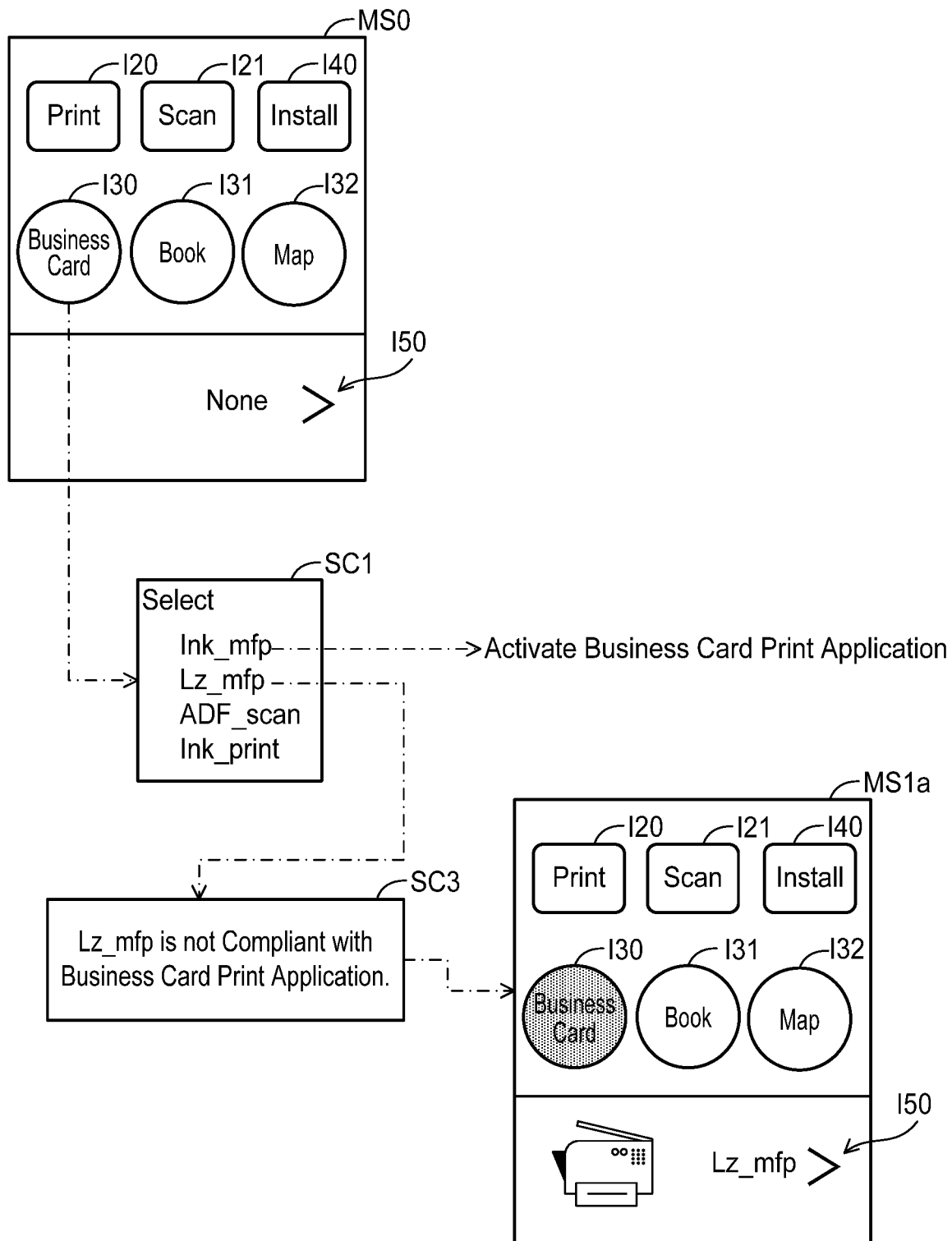
FIG. 11 shows a specific example of a screen displayed in a case where an application icon is selected in a default menu screen.

(Specific Examples of Screen; FIG. 11)

Specific example of the screen displayed when an app icon is selected in the default menu screen MS0 will be described with reference to FIG. 11.

For example, the user selects the business card icon I30 in the default menu screen MS0 (YES in S14 of FIG. 4). Due to this, the terminal device 10 displays the device designation screen SC1 (S18).

In one case, the user designates the model name "Lz_mfp" of the multi-function peripheral 200 in the device designation screen SC1. In this case, since the model name "Lz_mfp" is not included in the compliance list corresponding to the business card print app 40 indicated by the selected business card icon I30 (NO in S214 of FIG. 10), the terminal device 10 displays a noncompliance screen SC3 (S216). Due to this, the user can recognize that the business card print app 40 indicated by the selected business card icon I30 is not compliant with the multi-function peripheral 200 being the target device.

After the noncompliance screen SC3 is displayed, the terminal device 10 returns to S10 of FIG. 4, determines that the target information 32 is stored in the memory 24 (YES in S10), executes the processes of S40 to S60, and displays the menu screen MS1a (S90). As aforementioned, the menu screen MS1a includes the business card icon I30 having the grayed-out displaying state.

In another case, the user designates the model name "Ink_mfp" of the multi-function peripheral 100 in the device designation screen SC1. In this case, since the model name "Ink_mfp" is included in the compliance list corresponding to the business card print app 40 (YES in S214 of FIG. 10), the terminal device 10 activates the business card print app 40 and causes the multi-function peripheral 100 being the target device to execute the print process corresponding to the business card print app 40 (S220). That is, after the target device has been designated by the processes of S16 to S22 of FIG. 4, the terminal device 10 causes the multi-function peripheral 100 to execute the print process corresponding to the business card icon I30 being the selected icon, without displaying a menu screen. In the first embodiment in which a menu screen is displayed again after the processes of S16 to S22 of FIG. 4, the user needs to select the same business card icon I30 twice to cause the multi-function peripheral 100 to execute the print process corresponding to the business card icon I30. Contrary to this, in this embodiment, the user simply needs to select the business card icon I30 once. The convenience for the user is improved. The noncompliance screen SC3 of FIG. 11 is an example of "notification screen". S216 of FIG. 10 is an example of "displaying a notification screen on the display unit".

Third Embodiment

In this embodiment, a part of the process of FIG. 6 executed by the CPU 22 of the terminal device 10 is different from that of the first embodiment.

(Application Specifying Process; FIG. 6)

The process of FIG. 6 is similar to that of the first embodiment, except that contents of the processes of S66 and S68 are different. In S66, the CPU 22 sends an inquiry request including the model name included in the target information 32 and the app ID included in the specific app information to the list providing server 600 through the LAN I/F 14 and the Internet 6.

The inquiry request is a request for inquiring the list providing server 600 whether the target device is compliant with the plug-in app. When receiving the inquiry request, the list providing server 600 specifies the compliance list corresponding to the app ID included in the inquiry request from the compliance list table 630. In a case of determining that the model name included in the inquiry request is included in the specified compliance list, the list providing server 600 sends an inquiry response including a result indicating that the target device is compliant with the plug-in app to the terminal device 10. On the other hand, in a case of determining that the model name included in the inquiry request is not included in the specified compliance list, the list providing server 600 sends an inquiry response including a result indicating that the target device is not compliant with the plug-in app to the terminal device 10.

In S68, the CPU 22 receives the inquiry response from the list providing server 600, and determines whether the result included in the received inquiry response indicates compliance or noncompliance. In a case of determining that the result included in the received inquiry response indicates compliance (YES in S68), the CPU 22 skips S70 and proceeds to S72. On the other hand, in a case of determining that the result included in the received inquiry response indicates noncompliance (NO in S68), the CPU 22 changes the grayout flag included in the specific app information in the app information table 30 from "OFF" to "ON" in S70.

According to the present embodiment as well, similarly to the first embodiment, it can be determined whether or not the target device is compliant with the respective plug-in apps installed in the terminal device 10. Then, the terminal device 10 can use this determination result and display a menu screen that includes an app icon indicating a plug-in app not compliant with the target device in the grayed-out displaying state (for example, MS1a of FIG. 8). In the present embodiment as well, similarly to the first embodiment, an execution instruction of image process corresponding to a plug-in app can be prevented from being sent to the target device when the target device is not compliant with the plug-in app.

(Variant 1) In each of the above embodiments, the compliance list table 630 stores the lists of the model names of the image processing devices compliant with the plug-in apps. Instead of this, the compliance list table 630 may store lists of model numbers or serial numbers for identifying the image processing devices compliant with the plug-in apps. In this case, in a case of determining that the model number or the like of the target device is not included in the list received from the list providing server 600 in S68 of FIG. 6, the terminal device 10 may execute the process of S70. In this variant, the model number or the serial number is an example of "first device information".

(Variant 2) In each of the above embodiments, the list providing server 600 stores the compliance list table 630. Instead of this, the list providing server 600 may store a compliance spec table. The compliance spec table stores the app IDs, the app names, and compliance specs in association with each other. Each compliance spec indicates a spec of an image processing device (such as the laser scheme, the ADF scheme, etc.) that is compliant with the plug-in app identified by its corresponding app ID. In this case, in a case of determining that the spec of the target device does not match the compliance spec received from the list providing server 600 in S68 of FIG. 6, the terminal device 10 may execute the process of S70. In this variant, the spec of the target device is an example of "first device information".

(Variant 3) In each of the above embodiments, the app information table 30 stores the grayout flags. Instead of this, the app information table 30 may store hide flags. Each hide flag is set to either one of "ON" indicating that the corresponding plug-in app is to be hidden or "OFF" indicating that the plug-in app is to be displayed. In this case, the terminal device 10 may change the hide flag from "OFF" to "ON" in S70 of FIG. 6. Further, in a case of setting the hide flag in the app information table 30 to "ON", the terminal device 10 may display a menu screen that does not include the app icon indicating the plug-in app identified by the app ID corresponding to the hide flag. To express the above in general terms, "first menu screen" may not include the (M-N) icons indicating the (M-N) applications.

(Variant 4) As explained in the above comparative examples, the terminal device 10 may not execute the process of S66 of FIG. 6. In this case, the terminal device 10 may receive and store a compliance list corresponding to a plug-in app from the list providing server 600 upon installing the plug-in app, and may execute the process of S68 by using the stored compliance list. To express the above in general terms, "specifying N applications" may specify the N applications from among the M applications by using specification information in the memory.

(Variant 5) In each of the above embodiments, the compliance list table 630 stores the compliance lists. Instead of this, the compliance list table 630 may store noncompliance lists. Here, each noncompliance list is a list of the model names of the respective image processing devices that are not compliant with the plug-in app identified by the corresponding app ID and app name. In this case, in the case of determining NO in S64 of FIG. 6, the terminal device 10 may receive the noncompliance list from the list providing server 600. Then, the terminal device 10 may execute S70 in a case where the model name included in the target information 32 is included in the noncompliance list. The terminal device 10 may skip S70 in other cases and execute S72. In this variant, the noncompliance list is an example of "specification information".

(Variant 6) In the above first embodiment, the menu screen MS2*a* of FIG. 8 does not include the scan icon I21. Instead of this, the menu screen MS2*a* may include the scan icon I21 having the grayed-out displaying state. To express the above in general terms, "first menu screen" may not include other icon (such as the scan icon), or may include the other icon having a displaying state different from a displaying state of one icon (such as the print icon).

(Variant 7) In the above second embodiment, the terminal device 10 sends the app ID of the plug-in app indicated by the selected icon to the list providing server 600 in S212 of FIG. 10. Instead of this, the terminal device 10 may send all the app IDs in the app information table 30 to the list providing server 600, and receive all the compliance lists corresponding to all the app IDs from the list providing server 600. Then, the terminal device 10 may specify one or more compliance lists including the model name of the target device from among all the received compliance lists. Further, the terminal device 10 may display a list of app names of one or more app IDs corresponding to the one or more specified compliance lists. In this variant, the list of the app names of the one or more app IDs is an example of "notification screen".

(Variant 8) The terminal device 10 may not execute the process of S40 of FIG. 4. In this variant, "receiving function information indicating a function that the first image processing device is capable of executing" and "sending an execution instruction for the print (and scan) function" may be omitted.

(Variant 9) The terminal device 10 may not execute the processes of S14 to S24 of FIG. 4. Instead of this, the terminal device 10 may execute S100 after S12. In this case, the terminal device 10 may execute the processes of S14 to S24 of FIG. 4 after S112 of FIG. 7, and then may execute the process of S114. In this variant, "displaying a designation screen" may be omitted.

(Variant 10) The communication system 2 may include only one image processing device (e.g., the multi-function peripheral 100). In this variant, "registering second device information", "specifying L applications corresponding to one or more types of image processes that the second image processing device is capable of executing", and "displaying a second menu screen" may be omitted.

(Variant 11) Each of the plug-in apps 40 to 44 may be installed to the terminal device 10 at a same time as the print scan app 28. The menu screen may not include the install icon. In this variant, "determining whether the first image processing device is capable of executing an image process corresponding to the additional application", "displaying a third menu screen", and "displaying a fourth menu screen" may be omitted.

(Variant 12) The business card print app 40 may be a plug-in app for causing an image processing device to execute not only the print process of an image on the business card-size print medium, but also a scan process for a business card-size document. That is, one plug-in app may correspond to two or more types of image processes. To express the above in general terms, "N applications" may correspond to N types of image processes, or may correspond to N or more types of image processes.

(Variant 13) In each of the above embodiments, the terminal device 10 executes the processes of S64 to S72 of FIG. 6 to each of the app information in the app information table 30. Instead of this, in a case where the target device is capable of executing only one of the print function and the scan function, the terminal device 10 may specify the app information of the plug-in apps (such as the business card print app 40 and the map print app 44) related to the one function (such as the print function) from among all the app information in the app information table 30. Further, the terminal device 10 may execute the processes of S64 to S72 of FIG. 6 to each of the specified one or more app information.

(Variant 14) In each of the above embodiments, the respective processes of FIGS. 4 to 7 and 10 are executed by the CPU 22 of the terminal device 10 executing the programs 26, 28 (that is, software). Instead of this, one or more of the processes may be implemented by hardware such as logic circuits.

What is claimed is:

1. A non-transitory computer-readable medium storing computer-readable instructions for a terminal device,
    the computer-readable instructions, when executed by a processor of the terminal device, causing the terminal device to:
    register first device information of a first image processing device in a memory of the terminal device in a case where the first image processing device is designated, from among one or more image processing devices with which the terminal device is capable of communicating, as a target image processing device that is to execute an image process;
    after the first device information has been registered in the memory, specify, by using the first device information in the memory, one or more applications corresponding to one or more types of image processes that the first image processing device is capable of executing;
    display a first menu screen on a display unit of the terminal device, the first menu screen including predetermined one or more default icons and one or more icons indicating the specified one or more applications, wherein before the first device information is registered in the memory, a specific menu screen including the one or more default icons is displayed on the display unit; and
    in a case where a target icon is selected from among the one or more icons included in the first menu screen, send an execution instruction to the first image processing device by using a target application indicated by the selected target icon, the execution instruction being for a target image process corresponding to the target application.

2. The non-transitory computer-readable medium as in claim 1, wherein
    the one or more icon includes an icon indicating an application for causing an image processing device to execute print of an image on a CD.

3. The non-transitory computer-readable medium as in claim 1, wherein
    the one or more types of image processes is a process which is related to at least one of a print function and a scan function, and
    the one or more default icons includes an icon indicating the at least one of the print function and the scan function.

4. The non-transitory computer-readable medium as in claim 1, wherein
    the memory is configured to store, for each of a plurality of applications that the computer-readable instructions are capable of using, specification information for specifying an image processing device that is capable of executing an image process corresponding to the application, and
    the one or more applications are specified from among the plurality of applications by using the first device information and the specification information in the memory.

5. The non-transitory computer-readable medium as in claim 4, wherein
    the computer-readable instructions, when executed by the processor, further cause the terminal device to:
    send an inquiry request to a server, the inquiry request including the first device information in the memory and a plurality of application identification information for identifying the plurality of applications, the inquiry request being for causing the server to:
        determine whether the first image processing device indicated by the first device information is capable of executing an image process corresponding to each of the plurality of applications identified by the plurality of application identification information; and
        send an inquiry response including a result of the determination,
    wherein the one or more applications are specified from among the plurality of applications based on the result of the determination included in the inquiry response received from the server.

6. The non-transitory computer-readable medium as in claim 1, wherein
    the computer-readable instructions, when executed by the processor, further cause the terminal device to:
    in a case where a specific icon among the one or more default icons in the specific menu screen is selected, display a designation screen for designating a specific image processing device from among the one or more image processing devices, and
    the first device information is registered in the memory in a case where the first image processing device is designated in the designation screen.

* * * * *